Patented Dec. 10, 1946

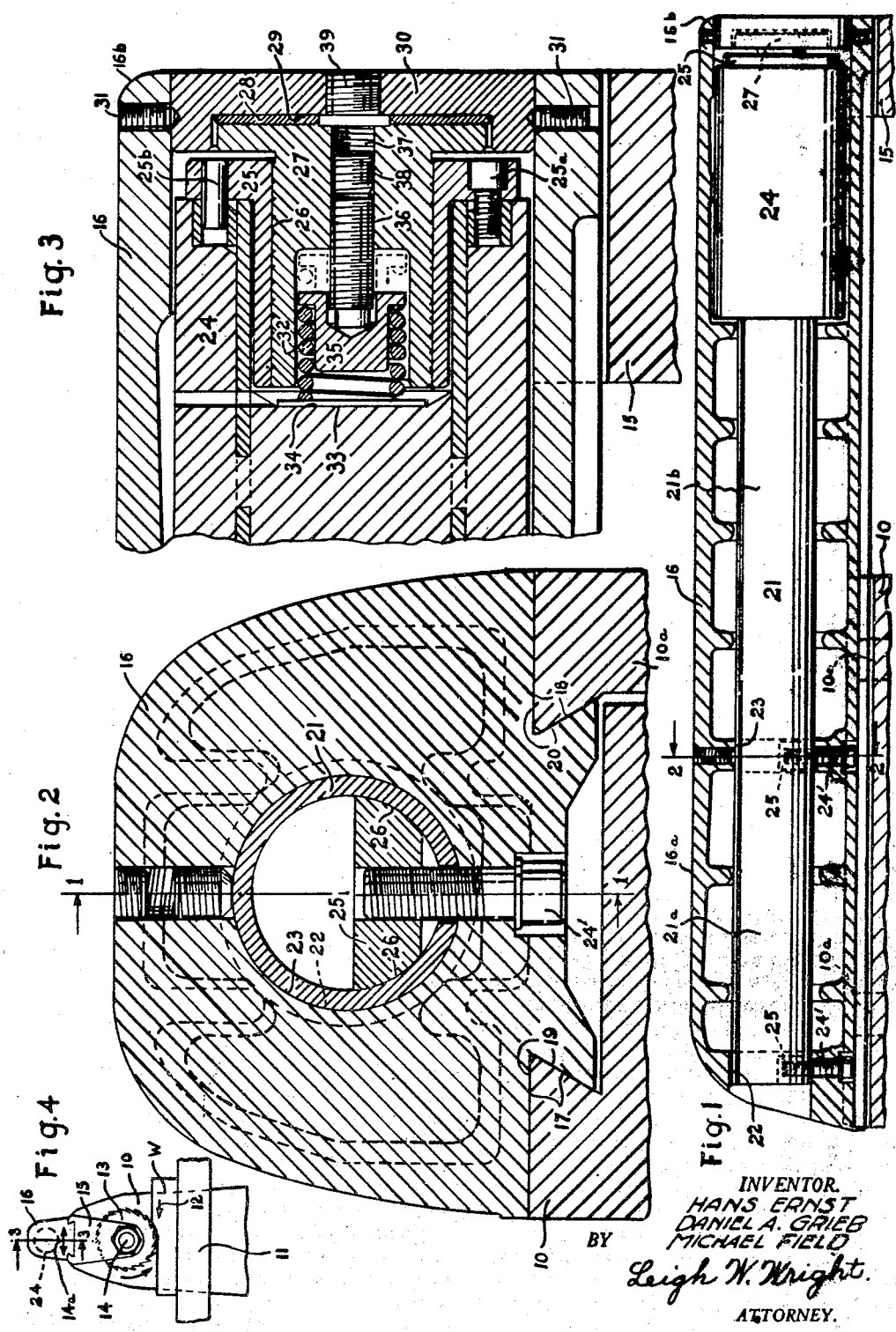

2,412,499

UNITED STATES PATENT OFFICE 2,412,499

MACHINE TOOL VIBRATION DAMPENER

Hans Ernst, Daniel A. Grieb, and Michael Field, Cincinnati, Ohio, assignors to The Cincinnati Milling Machine Co., Cincinnati, Ohio, a corporation of Ohio Application August 30, 1944, Serial No. 551,912

11 Claims. (Cl. 90—11)

This invention relates to machine tools and more particularly to an overarm vibration dampener for milling machines.

One of the objects of this invention is to provide an improved mechanism for damping and absorbing vibration and chatter initiated by the cutting action of the cutter and work in a milling machine.

Another object is to provide a milling machine overarm vibration dampener of high efficiency and effective for a wide range of frequencies of vibration.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a vertical longitudinal section through the overarm and vibration damping mechanism comprising this invention.

Figure 2 is an enlarged transverse section through the overarm and vibration damping mechanism on the line 2—2 of Figure 1.

Figure 3 is a fragmentary enlarged section of the front portion of the overarm on the line 3—3 of Figure 4.

Figure 4 is a fragmentary diagrammatic view of a portion of a typical milling machine to which this invention may be applied.

In machine tools in which a relative movement of work and tool is provided for purposes of effecting a machining operation, vibration and chatter frequently are present due to the interaction of cutter and work piece. Such vibration and chatter are particularly present in milling machines, especially of the horizontal type utilizing an overarm to provide the outboard support for the cutter arbor driven from the cutter spindle of the machine. In such a milling machine structure the intermittent inter-action between cutter and work due to the successive presentation of the cutting edges of the milling cutter to the work piece during the feeding movement frequently results in inaccuracies and chatter marks in the finished work surface and damage to the cutter and the power transmission of the machine if allowed to continue unrestricted.

It is recognized that in such a milling machine the outer end portion of the overarm, removed from the column portion to which the overarm is clamped to the machine frame, particularly partakes of violent vibration, especially in instances where the outer end of the overarm cannot be appropriately held to the machine frame by a suitable brace. In such instances the outer portion of the overarm may oscillate rapidly under heavy cutting operations to such an extent as to make such machining operations unsatisfactory. It is, therefore, the purpose of this invention to provide a vibration damping mechanism incorporated in the overarm which is automatically effective at any time to minimize or reduce vibration in the overarm structure when utilized as an outboard support for the cutter arbor so that the machine may readily be utilized for high production work under these conditions without giving rise to objectionable chatter and vibration.

For illustrative purposes, this invention is shown applied to a typical horizontal type of milling machine, Figure 4, having the usual column 10 on which is appropriately mounted the work table 11 and upon which may be placed the work W. The table 11 may feed the work W in the direction of the arrow 12 to a suitable milling cutter 13 to effect the desired machining operation. The milling cutter 13 is carried on a suitable arbor 14 which is mounted at its rear end in the usual cutter spindle (not shown) of the milling machine carried in the column 10 and driven by any conventional transmission mechanism. The outer end of the arbor is supported by means of a suitable arbor support 15 depending from the housing or overarm 16 by means of suitable guideways 17 and 18 formed on the underside of the overarm. The overarm is mounted for appropriate alignment of the arbor support 15 with the arbor 14 and cutter spindle by providing suitable dovetail guideway surfaces 19 and 20 in the top portion of the column 10 which may be rigidly clamped by any suitable clamping means 10a to the guideways 17 and 18 of the overarm to securely hold its rearward portion 16a to the machine column or frame.

It can be seen that the rear portion 16a of the overarm is thus positively held against vibration on the machine column 10. However, the frontward projecting portion 16b extending out beyond the column and carrying the overarm support 15 is unsupported and may be deflected transversely, as indicated by the arrow 14a, Figure 4, in vibratory oscillating motions perpendicular to the longitudinal axis of the overarm. Such vibration or transverse displacement of the overarm at its outer end is caused by the intermittent action of the cutting teeth of the cutter 13 operating against the work piece W on the work table 11 as the table feeds the work to the cutter. The rate of vibration of this outer portion of the overarm may change greatly in frequency for different types of machining operations due both to the number and pitch of the teeth of the cutter, the rate of rotation of the cutter, and the character of the material being machined. Because of this great variation in the frequency of vibration it is necessary to provide some means for absorbing and minimizing the vibration in the overarm which has a wide range of effectiveness.

In order to accomplish this, there is provided a vibration damping mechanism incorporated in the overarm comprising a mounting tube 21 which is rigidly clamped in bores 22 and 23 by appropriate clamping screws 24' threaded in clamps 25 which engage at the points 26 the inside bore of the tube 21 so as to rigidly hold this tube in the bores. It will be noted that the bores 22 and 23 are positioned in the overarm at its rearward portion within the confines of the area where it is normally clamped to the column 10 of the machine when in its extended outward position from the machine column as shown in Figure 1. Thus, the portion of the tube 21a between the bores 22 and 23 of the overarm is rigidly held against any movement relative to the overarm and the machine frame.

The mounting tube 21 has a portion 21b which projects outwardly toward the front of the machine from the mounting bore 23 in the overarm and is unsupported at its outer end so that it is resilient and free to permit its outer end to have transverse vibratory movements when acted upon by forces created during the machining operation. There is provided a suitable inertia member or weight 24 which may be actuated in tuned frequencies with the frequencies of vibration of the overarm. This weight is appropriately rigidly attached to the outer unsupported end of the mounting tube 21 and oscillates back and forth with the resilient portion 21b of the mounting tube. Thus, the entire mass of the weight 24 is supported through the resilient portion 21b of the mounting tube 21 in the rigid supporting bores 22 and 23 formed in the overarm 16.

In order to effect a vibration damping action between the weight 24 and the outer vibrating end 16b of the overarm 16 there is provided a frictional interengaging or damping means therebetween whereby vibratory oscillations in the outer end of the overarm sets up compensating out-of-phase vibratory oscillations in the weight 24 which tends to neutralize and minimize the amplitude of vibration initially created in the overarm by action of the cutter and work piece during the machining operation. This frictional interconnection comprises, Figure 3, a guide sleeve 25 rigidly fixed to the mounting tube and counterweight 24 by screws 25a and pin 25b. This sleeve is provided with a bore 26 in which is accurately slidably mounted a pressure spool 27 having an enlarged outer end to which is fixed a friction disc 28 which engages a friction surface 29 formed on a suitable friction plate 30 rigidly mounted on the overarm 16 by suitable screws 31.

Means are provided for maintaining a predetermined amount of pressure longitudinally of the mounting tube and overarm by pressure between the composition friction disc 28 and the friction surface 29 of the plate 30. A compression spring 32 is provided which abuts against a suitable washer 33 bearing against the surface 34 of the weight 24 and which is confined at its other end by an abutment spool 35. This spool may be moved axially to change the degree of compression of the spring 32 by a suitable adjusting set screw 36 carried in a threaded bore 37 formed in the pressure spool 27 so that the set screw may be adjusted to increase or decrease the compression in the spring 32 which normally forces the pressure spool 27 outwardly longitudinally of the mounting tube 21 to cause the friction disc to engage the transverse friction surface 29. It is to be noted that the friction surface 29 is parallel to the direction of transverse oscillating vibrating movement of the overarm. By varying the degree of pressure exerted by the spring 32 the frictional coefficient of relative movement between the weight 24 and the overarm 16 may be adjusted to any desired value. A suitable locking set screw 38 is also preferably provided in the threaded bore 37 to rigidly hold the set screw 36 in adjusted positions. A closure screw 39 may also be provided in the friction disc 30 which may be readily removed when making adjustments in the set screw 36.

In operation, as the cutter 13 engages the work W causing vibration to be set up in the overarm 16, the frictional interengaging means between the friction disc 28 and plate 30 will tend to likewise cause the weight 24 to vibrate. However, because of the slipping action between the composition disc 28 and the surface 29 there will develop a lag or out-of-phase relationship between the oscillatory motions of the overarm and the inertia member. The mounting tube and inertia member are so proportioned as to have a natural frequency of vibration substantially the same as the natural frequency of vibration of the overarm so that by appropriately adjusting the set screw 36 and thereby the frictional coefficient between the composition disc 28 and the friction surface 29 the lag or out-of-phase relationship may be tuned so that the weight 24 will be normally oscillating in the opposite direction relative to the oscillation of the overarm 16. In this way, the energy created through the frictional engagement of the disc 28 will tend to neutralize the vibration set up in the overarm by the cutting action. Thus, the vibration damping mechanism incorporated in the milling machine overarm may be readily tuned and adjusted to absorb vibratory movements set up in the overarm by the cutting action of work and tool.

An improved feature of this arrangement lies in the fact that this overarm vibration dampener is effective at relatively low frequencies of vibration of the overarm. This is due to the fact that the weight 24 is carried solely by the resilient mounting means or tube 21 on the non-vibrating portion 16a of the overarm which is rigidly clamped to the machine frame. Thus, under conditions of low frequency vibration the resiliency of the mounting means is so arranged that the weight is not carried along by the low frequency vibration in the overarm but tends to remain in a fixed rigid position to thereby oppose low frequencies of vibration set up in the overarm by direct frictional opposition through the disc 28 and the surface 29. Under these conditions the vibration damping mechanism serves as an addition supplementary member to give added rigidity to the overarm.

There has therefore been provided a vibration damping mechanism for an overarm which is readily effective through a complete range of high and low frequencies of vibration to damp out vibration and furnish added rigidity to the overarm structure during the machining operation.

What is claimed is:

1. In a machine tool structure comprising a main frame, a work support on said frame, a tool support on said frame movable relative to said work support for interaction of work and tool in said machine, and vibration damping means associated with said tool support including an inertia member, resilient means mounted on said frame providing the sole means for supporting said inertia member, and frictional interengaging means between said inertia member and said tool support to restrict relative vibrational movements between the inertia member and tool support.

2. In a machine tool structure comprising, a frame, a tool support, and means for limiting vibrational movements in said tool support relative to said frame comprising a vibration damping mechanism including an inertia member, resilient means connected to said frame providing the sole means for supporting said inertia member, and frictional interengaging means between said inertia member and said tool support to limit relative vibrational movements of said tool support and said frame.

3. In a machine structure having, a main frame, a work support on said frame, a tool support on said frame, an outboard supporting means for said tool support mounted on said frame, and vibration damping mechanism to limit vibratory motion in said outboard supporting means including the combination of a weight, means mounted on said outboard supporting means at the point of its connection with said machine frame providing the sole means for resiliently supporting said weight, and frictional interengaging means between said weight and said outboard support to damp vibratory motion in said outboard support.

4. In a machine tool organization comprising a frame, a work support on said frame, a tool support on said frame, a supplemental support for said tool support mounted on said frame, and vibration controlling mechanism, for said supplemental support including a resilient mounting means fixed to the said frame, a vibration damping weight mounted on said resilient mounting means, and frictional interengaging means between said weight and said supplemental supporting means to damp vibrational movements in said supplemental support.

5. In a milling machine having a column, a work support, and a cutter movable relative thereto, an overarm fixed on said column, an outboard support on said overarm for supporting said cutter, and vibration damping mechanism associated with said overarm including an inertia member, a resilient mounting means for said inertia member, comprising a flexible tubular member rigidly connected to said overarm substantially at the point of clamping of said overarm to said column, and frictional interconnecting means between said inertia member and the outer end of said overarm to damp out relative vibrational movements therein during the cutting operation of the machine.

6. In an overarm structure for a milling machine comprising an elongated hollow housing, means for clamping one end of said housing to the column of the milling machine, means providing an outboard bearing support at the other end of said housing, a resilient tubular member fixed to said housing at the point of clamping of said housing to the milling machine column, a vibration absorbing inertia member fixed to the outer end of said tubular supporting member, and frictional interengaging means between said inertia member and said housing.

7. In an overarm structure for a milling machine comprising a rectangular elongated housing, means for clamping one end of said housing to the column of the milling machine, means providing an outboard bearing support at the other end of said housing, a resilient tubular member fixed to said housing at the point of clamping of said housing to the milling machine column, a vibration absorbing weight fixed to the outer end of said tubular supporting member, frictional damping means between said weight and said housing, and means for adjusting the frictional damping means to vary the effective frequency of vibration damping.

8. In a milling machine having a column, a work support mounted on said column, a horizontally extending overarm clamped at one end to said column, a cutter spindle in said column, a cutter arbor including a cutter mounted in said spindle, an arbor support depending from the outer end of said overarm and supporting said arbor, and vibration damping mechanism in said overarm comprising a resilient tubular mounting member extending longitudinally of said overarm and rigidly fixed to said overarm at the end thereof clamped to said column, a weight fixed on the outer free end of said resilient tubular mounting member, and an adjustable frictional damping means between said weight and the outer unclamped end of said overarm adjacent said arbor support to damp out vibrational movements in said overarm and arbor support.

9. In a vibration damping mechanism for a milling machine overarm comprising a hollow longitudinally extending body portion adapted to be clamped at one end to a rigid portion of the milling machine structure and adapted at its other end to carry an outboard support for a cutting tool of the machine, a vibration damping weight resiliently attached to said overarm at the point of clamping of said overarm to said machine structure and located adjacent the other end thereof, and frictional damping means between said weight and said overarm, and means for effecting a variation in the frictional characteristics of said damping means.

10. In a milling machine structure including a frame and an overarm adapted to have one end portion clamped to said frame, the combination of an inertia member resiliently supported from the clamped portion of said overarm in a position adjacent the free end thereof and frictional damping means between said overarm and said inertia member to transfer vibration from said overarm to said member.

11. In a milling machine having a column and an overarm adapted to be clamped at one end to said column, a vibration dampener for said overarm including an inertia member, means for supporting said member from the end of said overarm clamped to the column, a frictional damping means between said member and the outer end of said overarm to cause said member to vibrate in opposed oscillatory motion during high frequency vibration of said overarm and to act as a rigid member to oppose low frequency vibration in said overarm by direct frictional opposition through said damping means.

HANS ERNST.
DANIEL A. GRIEB.
MICHAEL FIELD.